April 1, 1941.    T. A. PETERMAN    2,236,695
VEHICLE SUPPORT
Filed June 23, 1937
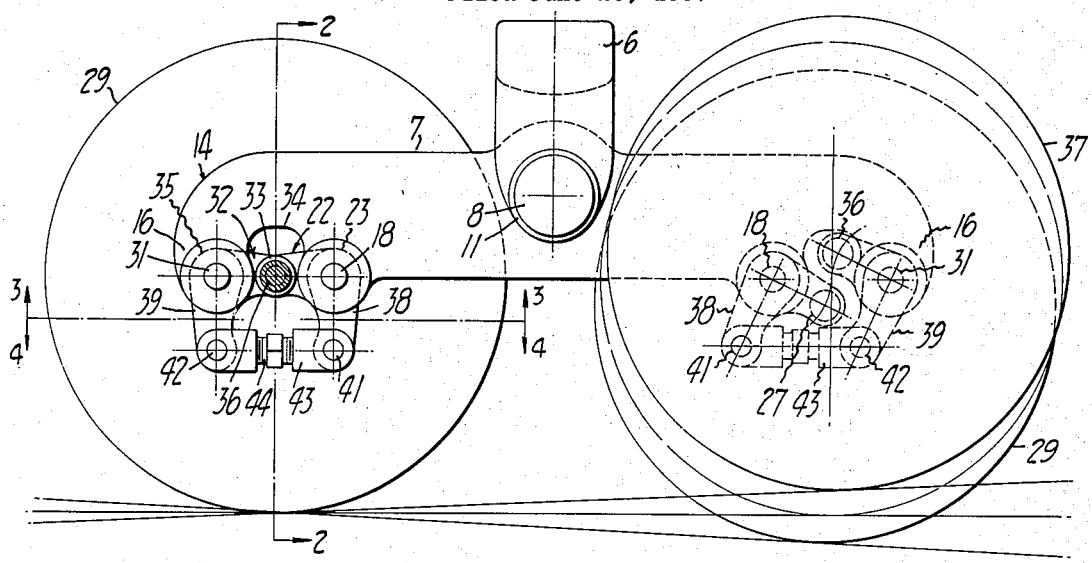
FIG_1_
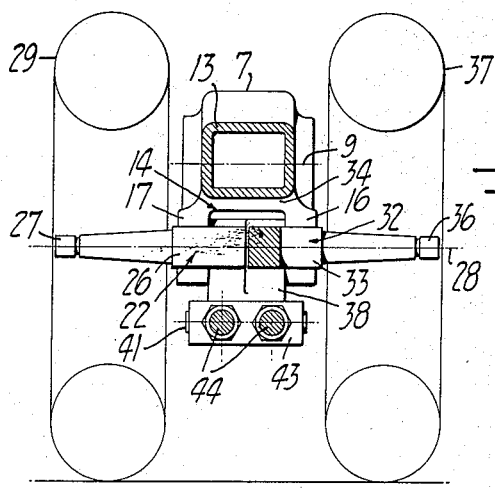
FIG_2_
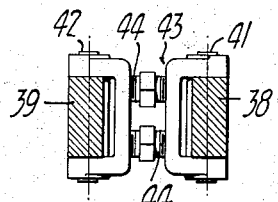
FIG_4_
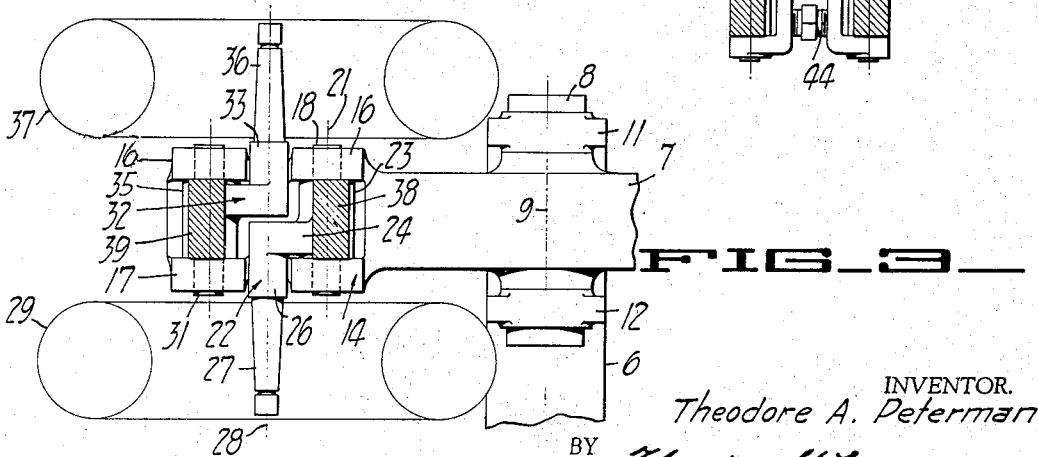
FIG_3_
INVENTOR.
Theodore A. Peterman
BY Theodore H. Lassagne
ATTORNEY.

Patented Apr. 1, 1941

2,236,695

UNITED STATES PATENT OFFICE 2,236,695

VEHICLE SUPPORT

Theodore A. Peterman, Tacoma, Wash.

Application June 23, 1937, Serial No. 149,842

15 Claims. (Cl. 280—81)

My invention relates to vehicles and a manner of supporting them upon the ground, and is of a character similar to that of my copending application entitled "Vehicle," filed April 15, 1937, with Serial No. 137,107, of which application this application is a continuation in part.

It is an object of my invention to provide a support for a vehicle by means of which the weight of the vehicle may be substantially equally borne by a plurality of ground-engaging wheels despite undulations in the terrain being traversed.

Another object of my invention is to provide a linkage mechanism for equalizing a pair of wheels, in which errors due to angularity are inconsequential.

Another object of my invention is to provide a vehicle support in which the spacing of the wheels can be virtually any amount desired.

Another object of my invention is to provide a vehicle support in which the components are simple mechanical elements readily fabricated and readily replaceable.

A further object of my invention is to provide a vehicle support which is especially useful in connection with ground-engaging wheels utilized in pairs.

Another object of my invention is in general to improve vehicle supports.

The foregoing and other objects are attained in the embodiment of the invention illustrated in the drawing, in which—

Fig. 1 is a side elevation, one wheel being removed for clarity, of a vehicle support constructed in accordance with my invention.

Fig. 2 is a cross-section the plane of which is indicated by the line 2—2 of Fig. 1.

Fig. 3 is a cross-section the plane of which is indicated by the line 3—3 of Fig. 1.

Fig. 4 is a cross-section the plane of which is indicated by the line 4—4 of Fig. 1.

In its preferred form, the vehicle support of my invention includes a frame on which an equalizer is mounted, the equalizer carrying at least one pair of ground-engaging wheels. The wheels are substantially coaxial and each is carried on a cranked axle mounted on the equalizer and connected to the other cranked axle for movement in unison therewith.

In its preferred form, the vehicle support of my invention is feasibly incorporated with heavy duty vehicles, such as log haulers, adapted for operation over smooth highways as well as over extremely irregular territory where in fact no roads exist. Since it is advisable to distribute the weight of the load over a large number of wheels so that the weight in any one location will not be excessive or concentrated, I preferably provide a means for distributing the weight substantially equally to all of the wheels under all circumstances, yet allowing adequate rising and falling movement of the wheels as undulatory ground is passed over.

My vehicle support is applicable to any vehicle having a main frame 6. The principal load is ordinarily imposed upon this frame and is to be distributed therefrom to the several wheels. For this reason I mount on or at the side of the frame 6 an equalizer 7 which is connected thereto by a pivotal connection including a pivot shaft 8 the axis 9 of which is transverse of the frame 6 and is perpendicular to the general plane or direction of the equalizer 7. Preferably, the equalizer fits between bosses 11 and 12 depending from the main frame 6, so that there is no transverse twisting moment on the equalizer 7. Since the opposite extremities of the equalizer extend substantially equal distances from the axis 9 and are subsantially identical, a description of one applies to both of them. The equalizer 7 is preferably of hollow box section 13 in its intermediate portions, and adjacent its end is bifurcated to provide a yoke 14 having substantially parallel horns 16 and 17.

Spanning the yoke 14 is an axle shaft 18 which is journaled in each of the horns 16 and 17 for rotary movement therein about an axis 21 which is substantially parallel with the axis 9. A cranked axle 22 is fastened on the shaft 18. A hub 23, included in the cranked axle, encompasses the shaft 18 and is connected by a cheek portion 24 extending substantially perpendicular to the axis 21 with a boss 26. A wheel spindle 27 extends from the boss 26 so that its axis 28 is substantially parallel with the axis 21 and with the axis 9.

This connection or mounting is such that the wheel spindle 27 moves in an arc about the axis 21 as a center. A ground-engaging wheel 29 is rotatably mounted on the spindle 27 to revolve about the axis 28 as a center, and rises and falls in a plane perpendicular to the axis 9 and parallel with the general plane of the equalizer 7 as the wheel goes over undulations in the ground. There is a slight forward and rearward movement of the wheel as it rises and falls, due to the arcuate mounting of the cranked axle 22, but there is no transverse movement or movement of the wheel 29 in the direction of the axis 28, so that the wheel always tracks or follows in a right line in moving forwardly over the ground and the angularity of the mounting links is inconsequential.

Likewise spanning the yoke 14, but at a location more remote from the axis 9 than is the shaft 18, I provide a second shaft 31 which is suitably journaled in the horns 16 and 17 for rotary movement with respect thereto. Mounted on and fast to the shaft 31 is a second cranked axle 32 which has a hub 33 extending through an indented portion 34 of the equalizer 7. A wheel spindle 36 projects from the hub 33 and is located so that in one position of the mechanism the spindle 36 is in exact alignment or is coaxial with the spindle 27, being concentric about the axis 28. In other positions, the spindles 27 and 36 depart from exact coaxiality in small amounts, but the spindles are still substantially coaxial. Mounted rotatably on the spindle 36, substantially parallel with the wheel 29, is a ground-engaging wheel 37 which, as it rises and falls, produces a corresponding rotation of the hub 35 and the shaft 31.

In accordance with my invention I provide means for interrelating the wheels 29 and 37 to move in unison. On the hub 23 there is formed a radially depending arm 38 which extends for substantially the full width of the hub. Likewise, I provide a second radially depending arm 39 on the hub 35. The arms in their normal position extend substantially parallel to each other and at their extremities are provided with pivot pins 41 and 42, respectively, which are centered about transverse axes parallel with each other and parallel with the axes 9, 21 and 28.

The pins 41 and 42 are joined by an equalizing link 43 including a pair of stiff members affording a threaded adjustment 44 so that the distance between the pivots 41 and 42 can be altered. Preferably, the arrangement is such that when the main frame 6 is loaded the adjustment 44 is operated so that with the vehicle level the spindles 36 and 27 are coaxial.

In the operation of this structure, if the wheel 37, for example, encounters an elevation, it rises, rotating the cranked axle 32 about the axis of the shaft 31 in a counterclockwise direction, as seen in Fig. 1. This moves the arm 39 and the link 43 to the right, as seen in Fig. 1. Correspondingly, the radial arm 38 is rotated in an anti-clockwise direction and carries with it the cranked axle 24, thereby correspondingly depressing the wheel 29. If the wheel should not happen to be on an exactly equal depression, then it remains at its previous height and the equalizer 7 is lifted at its extremity substantially half the amount of the elevation of the wheel 37. Since an entirely similar arrangement is provided on the opposite end of the equalizer 7, the main frame 6 of the vehicle is lifted substantially one-quarter the amount that the wheel 37 has been lifted; and throughout this movement the load on the main frame 6 is equally distributed to all four of the wheels.

I claim:

1. A vehicle support comprising an equalizer, a pair of ground-engaging wheels in substantial alignment transversely of said equalizer, and means including an equalizing link parallel to said equalizer for mounting said wheels on said equalizer.

2. A vehicle support comprising a frame, an equalizer mounted on said frame, a pair of cranked axles journaled in said equalizer, ground-engaging wheels on said axles, and a link connecting said axles for movement in unison.

3. A vehicle support comprising a frame, an equalizer mounted on said frame, a pair of cranked axles journaled on said equalizer with their axes substantially parallel, ground-engaging wheels on said axles, and a link connected to said axles to pivot thereon about axes parallel to said first axes.

4. A vehicle support comprising a frame, an equalizer mounted on said frame to pivot about an axis, a pair of cranked axles mounted on said equalizer each to pivot about an axis, a pair of ground-engaging wheels mounted on said axles each to rotate about an axis, and a link connected to both of said cranked axles to pivot about an axis on each, all of said axes being parallel.

5. A vehicle support comprising an equalizer, a cranked axle pivotally mounted on said equalizer, a wheel spindle on said axle, a second cranked axle pivotally mounted on said equalizer, a wheel spindle on said second axle in substantial alignment with said first spindle, and means for connecting said cranked axles for movement in unison.

6. A vehicle support comprising an equalizer, a pair of cranked axles mounted on said equalizer, a ground-engaging wheel on each axle, an arm on each axle, and means interconnecting said arms for movement in unison.

7. A vehicle support comprising an equalizer, a pair of cranked axles mounted on said equalizer, ground-engaging wheels on said axles in substantial axial alignment, and means interconnecting said axles for movement in unison.

8. A vehicle support comprising a yoke including two horns, a shaft journaled in said yoke, a cranked axle mounted on said shaft, a spindle on said axle projecting laterally from said yoke, a ground-engaging wheel on said spindle, an arm on said axle between said horns, a second shaft journaled in said yoke, a second cranked axle mounted on said second shaft, a second spindle on said second cranked axle projecting laterally from said yoke in a direction opposite to said first spindle, a second ground-engaging wheel on said second spindle, a second arm on said second axle between said horns, and an equalizer link pivotally connected to said arm and to said second arm.

9. A vehicle support comprising an equalizer, a first member rockably mounted on said equalizer and having extending ends, a first ground-engaging wheel rotatable on one of said ends, an equalizing link articulated with the other of said ends, a second member rockably mounted on said equalizer and having extending ends one of which is articulated with said equalizing link, and a second ground-engaging wheel rotatable on the remaining end of said second member.

10. In a vehicle, a compensating device for mounting a pair of wheels, said device including a longitudinal member, a pair of wheel-carrying assemblies, a wheel spindle in each of said assemblies, said spindles extending in opposite directions from said longitudinal member and substantially perpendicular to the plane of said longitudinal member, each of said assemblies hinged to said longitudinal member for up and down movement, said hinges being perpendicular to the plane of said longitudinal member, whereby said spindles may be moved up or down with respect to said longitudinal member, but will always be substantially perpendicular to said longitudinal member and the wheels on said spindles will always be spaced a constant distance from the plane of said longitudinal member, means definitely limiting the upward movement of each assembly, and compensating means connecting said assemblies, whereby upward movement of one assembly will cause a force to be exerted in the opposite direction on the other assembly.

11. In a vehicle, a longitudinal member, a pair of arms, a wheel spindle on each arm, said spindles extending in opposite directions from said longitudinal member and substantially perpendicular to the plane of said longitudinal member, each of said arms hinged to said longitudimember for up and down movement, said hinges being perpendicular to the plane of said longitudinal member, whereby said spindles may be moved up or down with respect to said longitudinal member but will always be substantially perpendicular to the plane of said longitudinal member and the wheels on said spindles will always be spaced a constant distance from the plane of said longitudinal member, means definitely limiting the upward movement of each arm, and compensating means connecting said arms, whereby upward movement of one arm will cause a force to be exerted in the opposite direction on the other arm.

12. A wheel suspension for vehicles comprising longitudinally extending beams pivotally mounted on each side of said vehicle, levers pivotally mounted on each of said beams for pivotal movement in a plane parallel to the plane of pivotal movement of said beam, and a pair of wheels mounted on the free ends of each of said levers.

13. In a vehicle, a pair of cranks journaled with respect thereto and extending forwardly and rearwardly from their respective journal axes, ground wheels secured to the cranks with their axes in substantial alignment, and means connected with the cranks and operative upon up movement of one crank to produce a down movement to the other.

14. A vehicle support mechanism comprising a mounting member attached to the frame of the vehicle, a pair of axially aligned ground wheels disposed one at each side of the mounting member, generally fore and aft extending crank arms connecting the mounting member to the respective wheels and for transmitting the entire vehicle load imposed on the mounting member through the lengths of the arms to the wheels, and differential mechanism connecting the arms to move them in opposite directions.

15. A vehicle wheel suspension comprising a mounting member attached to the frame of the vehicle, a pair of shafts journaled in parallel relationship to each other in said mounting member, crank arms, one on each of said shafts extending radially thereof in the direction of the other shaft, oppositely extending axles on each of said crank arms adjacent the free end thereof, road wheels mounted on said axles and normally disposed in substantial axial alignment, parallel crank arms, one on each of said shafts, and a motion transmitting member pivotally connecting said parallel crank arms whereby upward movement of one of said road wheels with respect to the frame of the vehicle will produce downward movement of the other of said road wheels with respect thereto.

THEODORE A. PETERMAN.